United States Patent [19]
Blohm

[11] 3,733,706
[45] May 22, 1973

[54] MACHINE ALIGNING DEVICE

[76] Inventor: Arthur M. Blohm, 7901 Leonora, Houston, Tex.

[22] Filed: July 15, 1970

[21] Appl. No.: 55,073

[52] U.S. Cl. ............... 33/180 R, 33/84, 33/172 R, 248/231, 248/DIG. 4
[51] Int. Cl. .............................................. G01b 3/38
[58] Field of Search ............... 33/180 R, 84, 172 R; 248/231, DIG. 4, 291

[56] References Cited

UNITED STATES PATENTS

| | | |
|---|---|---|
| 3,525,158 | 8/1970 | Torlay ........................... 33/180 R |
| 2,833,051 | 5/1958 | Cunningham ................. 33/180 R |
| 3,244,392 | 4/1966 | Sheets ........................... 33/180 R X |
| 2,815,582 | 12/1957 | Karstens ......................... 33/180 R |
| 2,733,035 | 1/1956 | Rocheleau ..................... 248/DIG. 4 |

Primary Examiner—William D. Martin, Jr.
Attorney—Ranseler O. Wyatt

[57] ABSTRACT

A machine aligning device for aligning a driving and a driven shaft, having means for mounting a block on a driving shaft, and adjustably anchoring said block in place, and a transverse shaft extending from said block on which a gauge is mounted.

1 Claim, 3 Drawing Figures

PATENTED MAY 22 1973 3,733,706
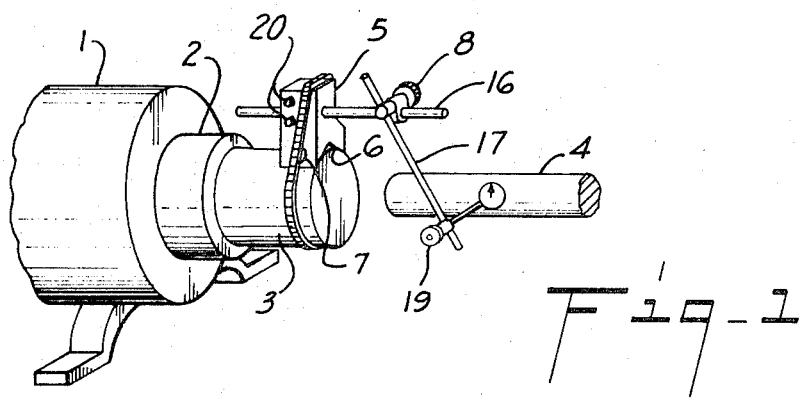
Fig-1
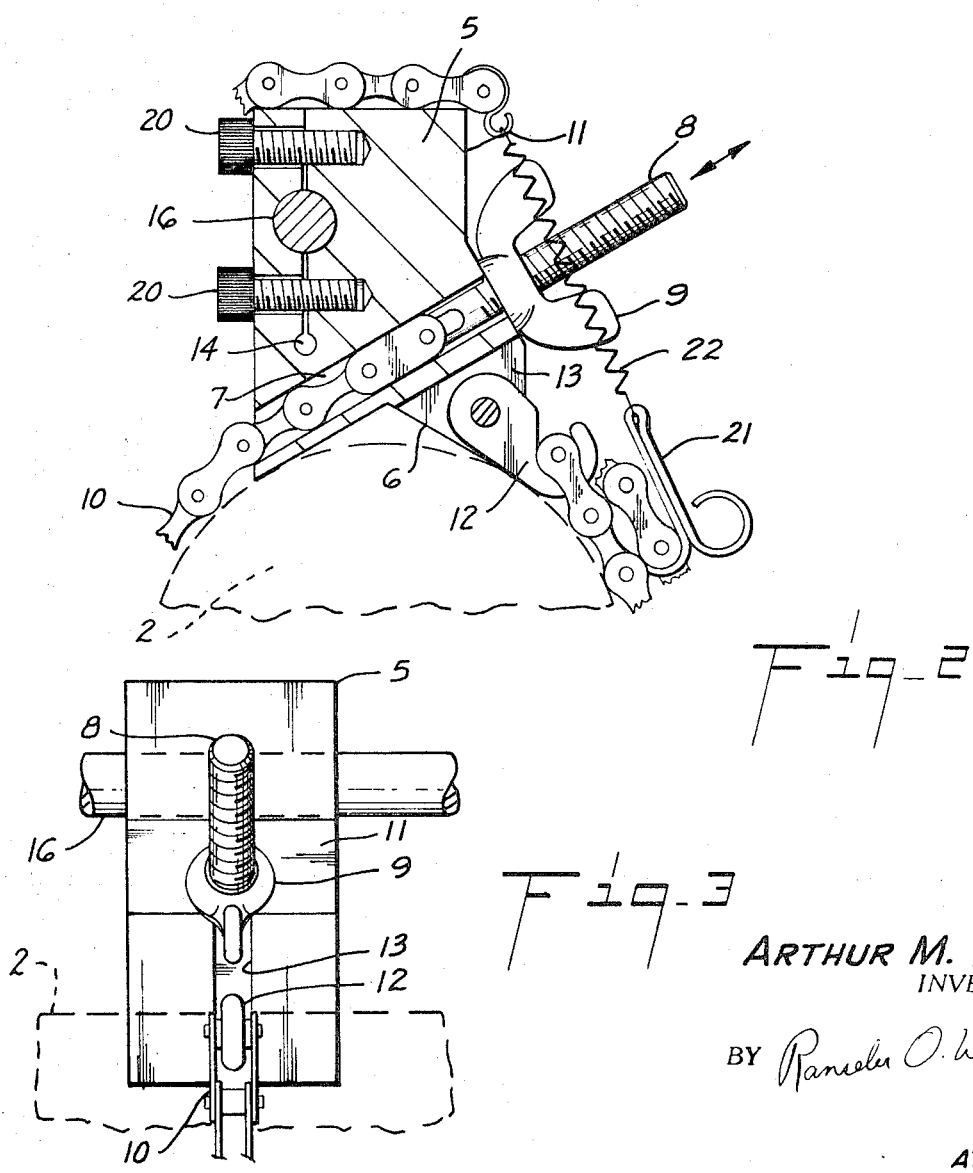
Fig-2
Fig-3
ARTHUR M. BLOHM
INVENTOR.
BY Ranselu O. Wyatt
ATTORNEY

MACHINE ALIGNING DEVICE

SUMMARY OF THE INVENTION

A machine aligning device for use in adjusting the position of a driving and a driven shaft consisting of a block shaped to straddle the coupling of one shaft and having a chain adjusting means mounted diagonally through said block, and a chain mounted on said chain adjusting means and extending out of one side of said block, to be wrapped around the coupling and secured to the opposite side of said block, and drawn into close fitting position on said coupling by said adjusting means, and means for securing the free end of said chain, and having an instrument holding means mounted on said block and extending transversely therefrom for maintaining an instrument in contact with the other shaft to be aligned.

BRIEF DESCRIPTION OF THE DRAWINGS

FIG. 1 is a side elevational view, showing the device mounted on a drive shaft and in contact with the driven shaft.

FIG. 2 is a side elevational fragmentary view, in cross section, and

FIG. 3 is a front elevational view of the device.

DESCRIPTION OF THE PREFERRED EMBODIMENT

In the drawing the numeral 1 designates a motor having a driving shaft 2 and coupling 3, in position to be aligned with the driven shaft 4, such as that of a pump or compressor. The block 5 is formed of a substantially rectangular piece of solid material, such as steel, having one end cut into a substantially V-shaped seat 6 to straddle the shaft 3, or the coupling 2, which is mounted on the shaft 3, and having a passageway 7 extending angularly therethrough on a plane with one leg of said seat 6 and in which the shaft 8 is mounted, said shaft 8 being externally threaded from one end thereof to a point adjacent the other end, and a wing nut 9 mounted on said threaded portion of said shaft 8 provides means for longitudinal movement of the shaft 8 in the passageway 7. One end of a master link of a chain as 10 is secured to the other end of said shaft 8, the chain 10 being a type of chain such as a sprocket gear chain, having connecting pivotal links.

The block 5 has one longitudinal face that is vertical and the other tapered outwardly from a point about midway of the longitudinal ends, forming a seat 11 for the adjusting nut 9, and a hook 12 is pivotally mounted in the outwardly extended portion of the block in the slot 13.

A transverse opening 14 is formed in the block 5 and extending from said opening to the outside face of the block is the slot 15. A transverse enlarged opening approximately midway between the opening 14 and the outside face of the block is formed to receive the shaft 16 on which the instrument holding shaft 17 is adjustably mounted as by means of the clamp 18. A gauge as 19 is mounted on the extended end of the shaft 17 and bears against the shaft 4. Set bolts, as 20, 20, provide means for securing the shaft 16 to the block.

In use the block 5 is seated on the coupling or drive shaft of the driving element, the seat 6 straddling the member to be aligned. The chain 10 is then wrapped around the shaft 3 and pulled up tight, with one link being fastened onto the hook 12, and the wing nut 9 is rotated to adjust the shaft 8 in the opening 7, drawing the chain tightly against the shaft 3, and the loose end of the chain 10 is then wrapped over the secured chain, and the pin 21, pivotally mounted on the end link of the chain 10, and which has the spring member 22, is stretched, and the open end of the pin 21 engaged in a link of the chain 10 to hold the loose end of the chain tightly in place on the device.

The gauge holding shaft 17 is then adjusted on the shaft 16, with the probe end of the gauge 19 bearing against the outer surface of the shaft to be aligned. The gauge shaft 17 is then locked in this position, and the user will slowly rotate the shaft 3 by hand, reading the dial of the gauge 21 as the shaft rotates, and adjusting the position of the element rotated by the shaft 4 as the need for adjustment is indicated.

Many positions may be accomplished in the positioning of the gauge 19, so that alignment may be possible of any two cooperating end abutting elements.

I claim:

1. In an alignment device for aligning rotating shafts of cooperating machines, a block having a seat formed at one end and a passageway extending therethrough and terminating adjacent the surface of a shaft to be aligned, a partially threaded shaft mounted in said passageway, one end of said last mentioned shaft being externally threaded, a link chain having one end pivotally mounted on one end of said last mentioned shaft and adapted to be drawn into said passageway and means on said block for receiving another link of said chain to lock the chain in position around a shaft to be aligned, and a gauge holding means adjustably mounted on said block and extending laterally from said block, and said means on said block for receiving another link of said chain consists of a pivotally mounted hook adapted to receive a selected link of said chain, the loose end of the chain being secured by a spring loaded loose end holding means having a U-shaped member at one end and a laterally extended handle at one end of said U-shaped member, and the other end of said member formed into a hook, said hook being adapted to engage a link of said chain, and the other end of said loose end holding means having a substantially S-shaped engaging means that snaps on the end link of the chain at the extended end thereof.

* * * * *